(12) United States Patent
Scott

(10) Patent No.: US 10,043,594 B2
(45) Date of Patent: Aug. 7, 2018

(54) PRACTICAL MOLTEN SALT FISSION REACTOR

(71) Applicant: Ian Richard Scott, Warwickshire (GB)

(72) Inventor: Ian Richard Scott, Warwickshire (GB)

( * ) Notice: Subject to any disclaimer, the term of this patent is extended or adjusted under 35 U.S.C. 154(b) by 356 days.

(21) Appl. No.: 14/768,658

(22) PCT Filed: Feb. 19, 2014

(86) PCT No.: PCT/GB2014/050481
§ 371 (c)(1),
(2) Date: Aug. 18, 2015

(87) PCT Pub. No.: WO2014/128457
PCT Pub. Date: Aug. 28, 2014

(65) Prior Publication Data
US 2016/0005497 A1    Jan. 7, 2016

(30) Foreign Application Priority Data

Feb. 25, 2013  (GB) .................................. 1303279.2
Jul. 9, 2013    (GB) .................................. 1312281.7
Oct. 18, 2013   (GB) .................................. 1318470.0

(51) Int. Cl.
*G21C 1/22*  (2006.01)
*G21C 1/03*  (2006.01)
(Continued)

(52) U.S. Cl.
CPC ............... *G21C 1/22* (2013.01); *G21C 1/03* (2013.01); *G21C 3/24* (2013.01); *G21C 3/54* (2013.01);
(Continued)

(58) Field of Classification Search
CPC ... G21C 1/22; G21C 1/03; G21C 3/24; G21C 3/54
(Continued)

(56) References Cited

U.S. PATENT DOCUMENTS 3,085,966 A    4/1963  Flora
3,251,745 A    5/1966  Teitel
(Continued)

FOREIGN PATENT DOCUMENTS

DE    14 39 107 A1    2/1969
DE       1439107 A1 *  2/1969  .............. G21C 1/22
(Continued)

OTHER PUBLICATIONS

MacPherson, "Molten-Salt Reactors: Report for 1960 Ten-Year-Plan Evaluation", ORNL 60-6-97, Jun. 1960. (Year: 1960).*
(Continued)

*Primary Examiner* — Jack W Keith
*Assistant Examiner* — Daniel Wasil
(74) *Attorney, Agent, or Firm* — Renner, Otto, Boisselle & Sklar, LLP

(57) ABSTRACT

A nuclear fission reactor comprising a core, a pool of coolant liquid, and a heat exchanger. The core comprises an array of hollow tubes which contain molten salts of fissile isotopes. The tube array is at least partly immersed in the pool of coolant liquid. The tube array comprises a critical region, where the density of the fissile isotopes during operation of the reactor is sufficient to cause a self-sustaining fission reaction. Heat transfer from the molten salts of fissile isotopes to the tubes is achieved by any one or more of natural convection of the molten salts, mechanical stirring of the molten salts, and oscillating fuel salt flow within the tubes. The molten salts of fissile isotopes are contained entirely within the tubes during operation of the reactor.

20 Claims, 7 Drawing Sheets

(51) Int. Cl.
  *G21C 3/24* (2006.01)
  *G21C 3/54* (2006.01)
(52) U.S. Cl.
  CPC ............... *Y02E 30/34* (2013.01); *Y02E 30/35* (2013.01); *Y02E 30/38* (2013.01)
(58) Field of Classification Search
  USPC ................................ 376/359, 360, 435, 453
  See application file for complete search history.

(56) References Cited

U.S. PATENT DOCUMENTS

| | | | |
|---|---|---|---|
| 3,261,759 A * | 7/1966 | Boudouresques | ....... G21C 3/08 376/454 |
| 3,527,669 A | 9/1970 | Bettis | |
| 3,996,099 A | 12/1976 | Faugeras et al. | |
| 4,045,286 A | 8/1977 | Blum et al. | |
| 4,759,896 A | 7/1988 | Boyd | |
| 2013/0322591 A1 | 12/2013 | Bashkirtsev et al. | |

FOREIGN PATENT DOCUMENTS

| | | | | |
|---|---|---|---|---|
| DE | 15 89 751 A1 | 3/1970 | | |
| EP | 0438880 A2 * | 7/1991 | ............ | G01J 5/0014 |
| GB | 922041 | 3/1963 | | |
| GB | 1034870 | 7/1966 | | |
| GB | 1192507 | 5/1970 | | |
| JP | 50-25592 | 8/1975 | | |
| JP | 61-117483 | 4/1986 | | |
| JP | 64-032189 | 2/1989 | | |
| JP | 01-217192 A | 8/1989 | | |
| JP | 04-212026 | 8/1992 | | |
| JP | 2003-043177 | 2/2003 | | |
| JP | 2006-194588 A | 7/2006 | | |
| JP | 2013-526709 A | 6/2013 | | |
| JP | 2014-010022 | 1/2014 | | |
| RU | 2424587 | 7/2011 | | |
| WO | WO 2013/116942 A1 | 8/2013 | | |

OTHER PUBLICATIONS

International Search Report and Written Opinion for corresponding International Application No. PCT/GB2014/050481 dated Jul. 3, 2014.
Written Opinion of the International Preliminary Examining Authority for corresponding International Application No. PCT/GB2014/050481 dated May 13, 2015.
British Search Report dated Aug. 28, 2013 for related British Application No. GB1303279.2.
British Search Report dated Aug. 28, 2013 for related British Application No. GB1312281.7.
Official Action for corresponding Japanese Application No. 2015-558544 dated Nov. 14, 2017 and its English translation.
English translation of Chinese Office Action dated Jul. 15, 2016 for corresponding Chinese Application No. 2014800102268.
Decision of Granting for related Russian Application No. 2015136814/07 dated Nov. 23, 2017 and its English translation.

* cited by examiner

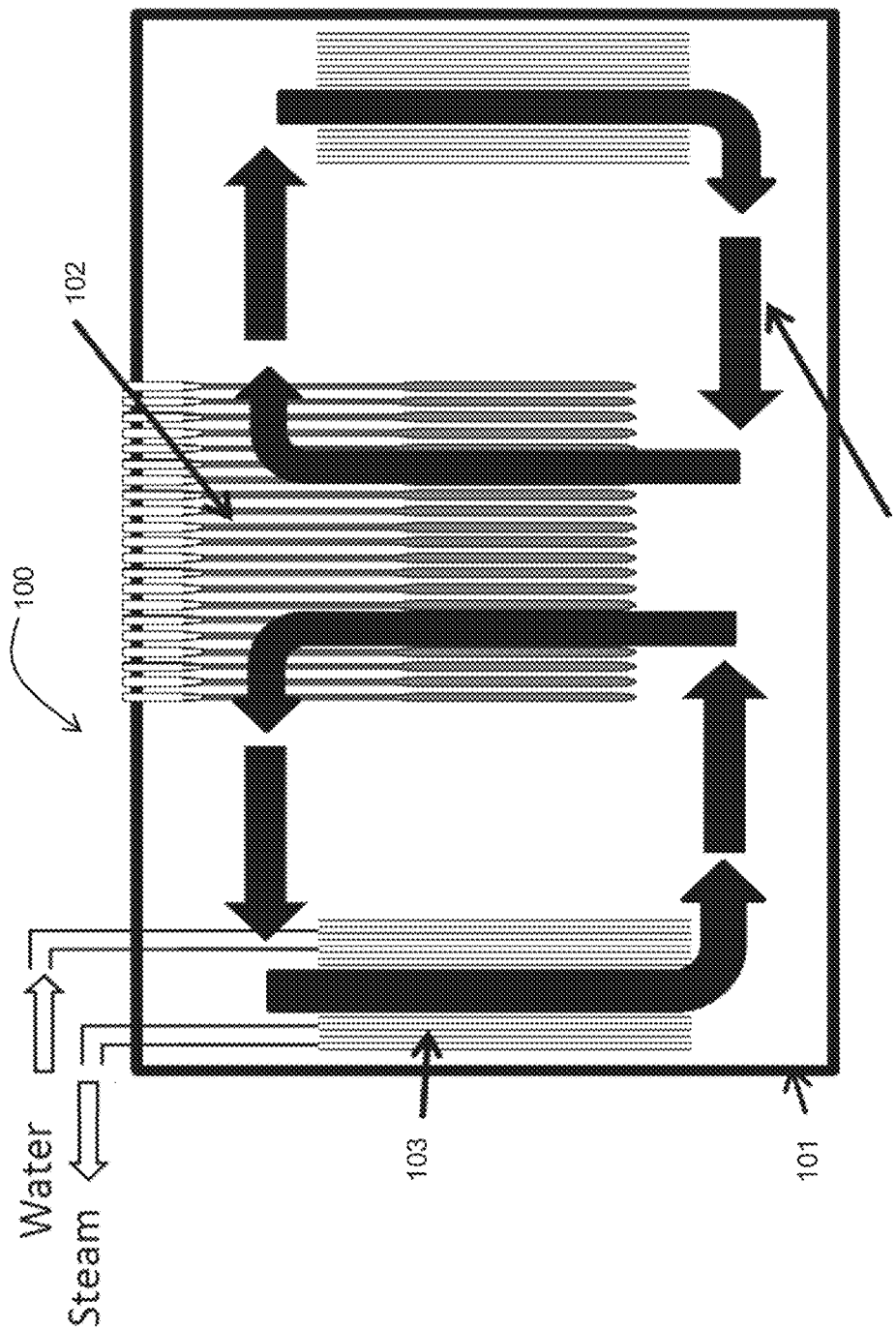

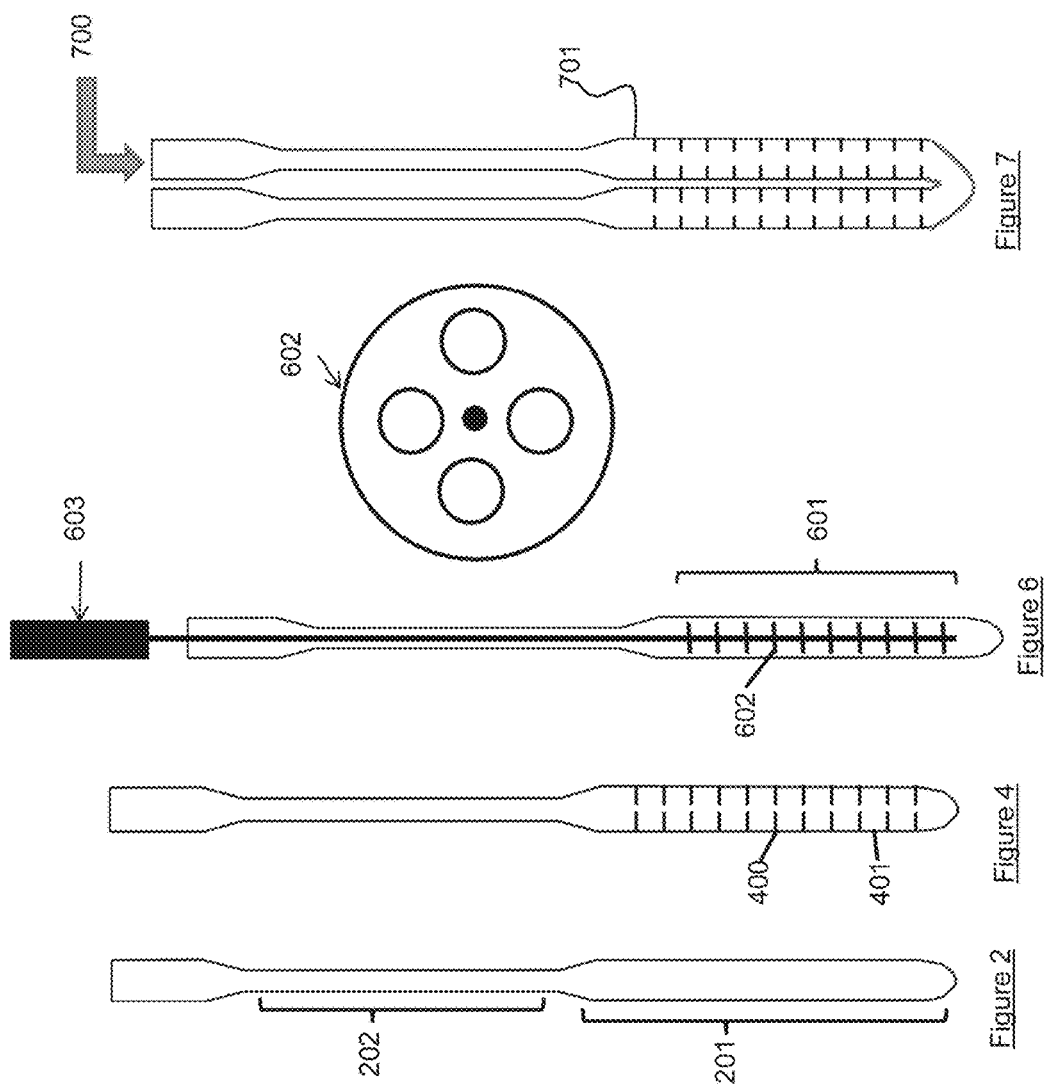

PRACTICAL MOLTEN SALT FISSION REACTOR

FIELD OF THE INVENTION

The invention relates to a molten salt fission reactor. In particular, the invention relates to a pool type reactor with a molten salt core.

BACKGROUND

Molten salt nuclear reactors are based on a critical mass of a fissile material dissolved in a molten salt. This is commonly referred to as fuel salt. They were pioneered at the Oak Ridge National Laboratory in the 1950's to 1970's but have never been successfully commercialised. They have several potential advantages over other reactor types which include the ability to breed fissile $^{233}U$ from thorium, production of much lower levels of transuranic actinide waste than uranium/plutonium reactors, operation at high temperatures, avoidance of accumulation of volatile radioactive fission products in solid fuel rods and much higher burn up of fissile material than is possible in conventional reactors.

Two major factors have prevented the commercialisation of such reactors.

Many designs of molten salt reactors require attached reprocessing plants to remove fission products continually from the fuel salt. This is necessary since fission products act as neutron poisons, especially in moderated reactors based on a thermal neutron spectrum. It is also necessary to remove insoluble fission products which would otherwise foul pumps and heat exchangers. Such reprocessing plant is complex, expensive and requires extensive development work.

Secondly, molten salts are highly corrosive. While nickel based superalloys are more resistant to such corrosion than standard steels, over long time periods corrosion would still occur. Thus design and manufacture of essential components such as pumps and heat exchangers represents a major development challenge. In principle, new composite materials based on carbon and/or silicon carbide have the chemical resistance to withstand the molten salt but building complex structures such as pumps and efficient heat exchangers from such materials remains very challenging.

Recently, Mattieu and Lecarpentier (Nuclear Science and Engineering: 161, 78-89 (2009)) showed that a non-moderated molten salt reactor could run for a decade or more without reprocessing. Their design still however involved pumps and heat exchangers and could only be built after major research and development of materials for such components.

A critical factor in any molten salt fuelled reactor is extraction of the heat produced by nuclear fission from the fuel salt. Many ways have been proposed to achieve this, a particularly good summary is provided by Taube (1978) (EIR Bericht no 332, Fast reactors using molten chloride salts as fuel). The methods described are Pumping a molten coolant such as lead, mercury or a volatile salt into the fuel salt so that the coolant both mixes and extracts heat from the fuel salt Pumping the fuel salt through an external heat exchanger Pumping a second molten salt or other coolant through pipes passing through the fuel salt with the fuel salt being forcibly pumped in a circulation pattern around the coolant pipes All of these proposed designs, other than the first, require pumping of the molten salt in some way. The first design, direct contact between the fuel salt and coolant, has been extensively investigated and is considered impractical for a number of reasons including entrapment of fuel salt in the coolant liquid.

A further design of molten salt reactor was proposed by Romie and Kinyon (ORNL CF 58-2-46, 1958) where the molten fuel salt was allowed to circulate through a heat exchanger by natural convection. This design however allowed only low power output and required a high volume of fuel salt outside the critical area of the core. Large volumes of fuel salt outside the core result in most delayed neutrons being emitted outside the critical area of the core. The resulting low delayed neutron fraction in the critical area of the core renders it unstable and liable to undergo a rapid and uncontrollable increase in power level leading to explosive destruction of the reactor.

A common feature of many conventional non molten salt reactor designs is to place the fuel material passively in tubes, around which coolant circulates, usually by pumping but sometimes just by natural convection. The fuel in the tubes can be a solid, as in the current generation of pressurised water reactors, a paste of solid material in molten sodium (GB 1,034,870), a metal (U.S. Pat. No. 3,251,745) or an aqueous solution (U.S. Pat. No. 3,085,966). Such an arrangement using molten salt fuel was considered by the Aircraft Reactor Experiment (The Aircraft Reactor Experiment-Design and Construction, E. S. Bettis et al, Nuclear Science and Engineering 2, 804, 1957). However, the researchers concluded that it would require fuel tubes with a very small diameter (of the order of 2 mm) in order to prevent overheating of the fuel salt due to the low thermal conductivity of the fuel salt. As a result, the project adopted a system of pumping the fuel salt rapidly through heat exchangers so that the resulting turbulent flow allowed effective heat transfer from the fuel salt to the walls of the much larger tubes. All molten salt reactor designs since then, including the Molten Salt Reactor Experiment which was actually built and operated (ORNL 5011 Molten Salt Reactor Program Semi-annual Progress Report August 1974) have used a similar pumped fuel salt arrangement.

SUMMARY

No effective proposal has been made to construct such a reactor with molten fuel salt in tubes where the fuel salt is not actively pumped through the tubes. In large part that is due to the belief that the low thermal conductivity of molten salts would not permit sufficiently rapid heat transfer from the salt to the wall of the tube without the forced turbulent mixing that pumping permits. As discussed above, the elimination of pumps for the fuel salt would greatly reduce the materials challenge in building a practical molten salt reactor.

According to one aspect of the present invention, there is provided a nuclear fission reactor comprising a core, a pool of coolant liquid, and a heat exchanger for extracting heat from the coolant liquid. The core comprises an array of hollow fuel tubes, each containing molten salt of at least one fissile isotope. The fuel tube array is at least partly immersed in the pool of coolant liquid. The fuel tube array comprises a critical region, where the density of the fissile isotopes during operation of the reactor is sufficient to cause a self-sustaining fission reaction. Heat transfer from the molten salt in each fuel tube to the exterior of that tube is achieved by any one or more of natural convection of the molten salt, mechanical stirring of the molten salt, oscillating fuel salt flow within the fuel tube, and boiling of the molten salt within the fuel tube. The molten salt of fissile isotopes are contained entirely within the tubes during operation of the reactor.

Thus the heat can be transferred from the interior to the exterior of unpumped fuel tubes without relying solely on the thermal conductivity of the molten salt, and this in turn allows the provision of tubes of a useful diameter. In particular, the tube diameter can be chosen to be sufficiently large to optimise natural convection within the tube.

According to a further aspect of the present invention, there is provided a nuclear fission reactor comprising a core, a pool of coolant liquid, and a heat exchanger. The core comprises an array of hollow tubes which contain molten salts of fissile isotopes. The tube array is at least partly immersed in the pool of coolant liquid. The tube array comprises a critical region, where the density of the fissile isotopes during operation of the reactor is sufficient to cause a self-sustaining fission reaction. The coolant liquid contains a sufficient proportion of a neutron absorbing material to substantially shield a containing tank of the liquid from neutrons emitted by the core, and the coolant liquid contains a fertile isotope such that the reactor acts as a breeder reactor. Said neutron absorbing material is optionally a fertile isotope such as 232Th or 238U such that the reactor acts as a breeder reactor.

According to a further aspect of the present invention, there is provided a nuclear fission reactor comprising a core, a pool of coolant liquid, and a heat exchanger. The core comprises an array of hollow tubes which contain molten salts of fissile isotopes. The tube array is at least partly immersed in the pool of coolant liquid. The tube array comprises a critical region, where the density of the fissile isotopes during operation of the reactor is sufficient to cause a self-sustaining fission reaction. The coolant liquid is a molten metal salt contained within a single tank, and the circulation of the coolant liquid is driven by natural convection only.

According to a further aspect of the present invention, there is provided a nuclear fission reactor comprising a core, a pool of coolant liquid, and a heat exchanger. The core comprises an array of hollow tubes which contain molten salts of fissile isotopes.

The tube array is at least partly immersed in the pool of coolant liquid containing one or more fertile isotopes. The tube array comprises a critical region, where the density of the fissile isotopes during operation of the reactor is sufficient to cause a self-sustaining fission reaction. The reactor further comprises a layer of molten metal in contact with the coolant liquid, the molten metal being such that the bred fissile isotope is soluble in the molten metal, and the reactor comprising a system for extracting the molten metal.

According to a further aspect of the present invention, there is provided a method of operating a nuclear fission reactor. The reactor comprises a core, a pool of coolant liquid and a heat exchanger, where the core comprises an array of hollow fuel tubes, each containing the molten salt of one or more fissile isotopes, the fuel tube array is at least partly immersed in the pool of coolant liquid and comprising a critical region, where the density of the fissile isotopes during operation of the reactor is sufficient to cause a self-sustaining fission reaction. The method comprised containing the molten salt entirely within the fuel tubes and transferring heat from the molten salt in each fuel tube to the exterior of that tube and thus to the coolant using one or more of: natural convection of the molten salt, mechanical stirring of the molten salt, oscillating molten salt flow within the fuel tube, boiling of the molten salt within the fuel tube. Heat is extracted from the coolant using the heat exchanger.

Further aspects and preferred features are set out in claim 2 et seq.

DESCRIPTION OF THE DRAWINGS

Some preferred embodiments of the invention will now be described by way of example only and with reference to the accompanying drawings, in which:

FIG. 1 is a diagram of a molten salt reactor;

FIG. 2 is a diagram of a fuel tube of the reactor of FIG. 1;

FIG. 4 shows a fuel tube with perforated baffles dividing the tube into segments;

FIG. 6 shows a fuel tube with mechanically driven baffles within the fuel tube;

FIG. 7 shows a fuel tube in the form of a U tube with internal baffles;

DETAILED DESCRIPTION

The Convection Cooled Nuclear Core

Figure 5:
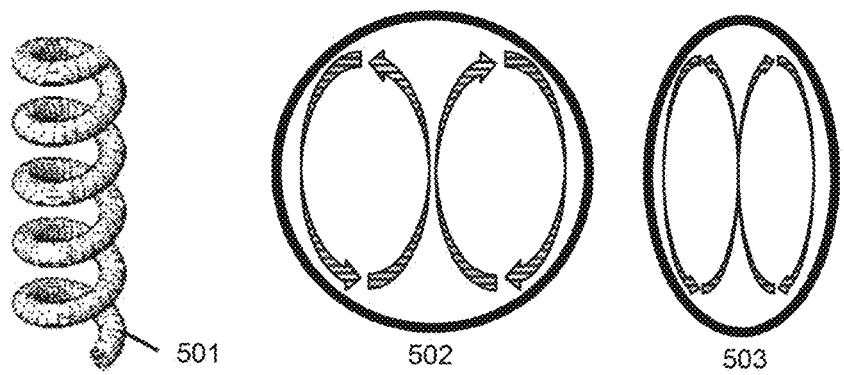
FIG. 5 shows a fuel tube with a circular or oval cross section tube arranged in a shallow helix.

A reactor may be constructed from a nuclear core using an array of fuel tubes immersed in a pool of molten coolant as shown in FIG. 1. FIG. 1 shows a reactor 100 comprising a tank of coolant 101, a core made up of an array of fuel tubes 102, and a heat exchanger (e.g. steam tubes) 103. The coolant can be a wide variety of liquids including water, molten metals, and molten salts. The tubes may be of any suitable shape, but in one embodiment they have a design whereby they have a large diameter region 201 at the bottom and a narrow region 202 towards the top (see FIG. 2). The result is that the lower portion of the array achieves critical mass while the upper portion remains subcritical. The tubes 102 may be filled with molten fuel salt containing fissile isotopes up to the top of the narrow region 202, or they may be filled only within all or part of the wide region 201. If the narrow region 202 is filled, then this prevents neutrons from escaping by passing up through the empty space within the fuel tube. If the narrow region is not filled with salt, then the narrow region may be formed into a spiral, helix or other non-linear form to prevent neutrons passing directly up the tube and out of the reactor. The tubes are arranged in an array which can be of any dimension and shape although a cylindrical array has certain advantages. The design output power of the reactor can be adjusted by varying the number of fuel tubes in the array.

Heat can be removed from the tube array by convective flow of the coolant (e.g. blanket salt). The narrow upper part 202 of the tubes allows for lateral flow of the heated blanket salt out of the tube array with less restriction than would be the case with fuel tubes of uniform diameter. Furthermore, the subcritical region increases the distance between the critical region of the core and the top of the tank, allowing for more effective neutron shielding. Heat is removed from the blanket salt through a heat exchanger 103 such as an array of boiler tubes immersed in the blanket salt, around the periphery of the reactor. The coolant for the heat exchanger could be, for example, water/steam, which may be passed directly to turbines, a gas, which is passed directly to a closed Brayton cycle turbine, or a molten metal or metal salt which is passed to a steam generator to generate steam for use in turbines. Alternatively, the hot blanket salt can be pumped out of the reactor for use in other heat dependent processes and then returned to the reactor tank, Neither the fuel salt nor the blanket salt requires pumps. This advantage removes what is perhaps the major technical hurdle that has held back molten salt reactor development. However, acceleration of the natural convective flow of the blanket through the array of fuel tubes by turbines or other pumping systems may be desirable in order to increase the power output from the reactor. The natural convective flow can also be increased by increasing the depth of the tank.

In order to achieve an adequate convection rate within the blanket salt, there needs to be a substantial temperature difference between the fuel salt and the blanket salt. This comprises the major trade off implicit in this reactor design—simplicity and cheapness vs. reduced thermodynamic efficiency. However, since fuel costs of nuclear reactors are essentially trivial, reduction of the cost of construction is far more important to the economics of the reactor than is the thermodynamic efficiency—indeed thermodynamic efficiency only really matters at all in such reactors to the extent that it spreads the capital cost over more kW of capacity.

Heat transfer from the fuel salts to the tube wall may be achieved by thermal conduction and convection, without pumping of the salts themselves. The convection may be assisted in various ways, further described below.

The dimensions of the fuel tubes are selected to enable rapid natural convection of the fuel salt at the operating temperature. This improves flow of the salt from the centre of the tube to the periphery, allowing the tubes to be cooled by natural convection and conduction alone. In general, tubes of smaller diameter will allow more rapid cooling of the fuel salt. However, this does not apply when the tube diameter becomes sufficiently small as to inhibit convection of the fluid. For a molten salt with a density of 4837–1.9537T kg/m$^3$, a specific heat of 418+0.136T J/kg·K, a viscosity of 0.0259–0.00198T kg/sec·m where T is the temperature in kelvin and a thermal conductivity of 0.81 w/m·K, convection does not occur for tube diameters below 5 mm. Other molten salts are likely to have minimum convective diameters of a similar order, so tubes with a diameter of at least 5 mm should be used.

Another factor limiting the diameter of the fuel tubes is the thickness of the tube walls, and the effect on criticality and neutronics of the reactor. In a non-moderated fast neutron reactor criticality is largely dependent on achieving a certain average concentration of fissile isotopes within the core region. The space between tubes cannot be arbitrarily reduced as tube diameter is reduced since gaps of less than 5 mm result in a rapidly increasing resistance to coolant flow. Nor can the wall thickness be arbitrarily reduced in proportion to tube diameter, since very thin walls would be easily perforated. For a tube of external diameter d (mm), a wall thickness of 0.5 mm and minimum distance between tubes of 5 mm, the fraction of total core volume occupied by fuel salt decreases from 70% for a 46 mm tube diameter (d) to 10% for a 4 mm tube diameter. Thus a reactor core comprising 4 mm tube would need a fuel salt containing seven times higher concentration of fissile material, which may well be unobtainable. Furthermore, all materials absorb neutrons to some extent. The greater the quantity of wall material within the reactor core, the higher this parasitic neutron loss. Higher parasitic losses mean that still higher concentrations of fissile material are required to achieve a critical mass. Small tube diameters result in a higher concentration of tube wall material within the core region. Thus smaller diameter fuel tubes result again in a higher concentration of fissile isotopes being needed.

The fuel tubes can incorporate fins on their outer surface in order to increase the area available for heat transfer to the coolant. Corrugation or ridging of the fuel tube wall similarly improves heat transfer to the coolant salt. The shape of the fins, corrugation, or ridging may be chosen to increase the heat transfer within the fuel salt due to convection.

Convective mixing of the fuel salt within the wide region of the fuel tube can allow realistic levels of heat transfer from the fuel salt. Temperature differences between the fuel salt in contact with the fuel tube wall and that at the centre of the fuel tube could be 500° C. or more without risking boiling of the fuel salt, which would correspond to a density difference of about 25% for many salt compositions which would enable significant convection. Molten salts with greater thermal expansion may be chosen to allow for more rapid convection. Similarly, molten salts with low viscosity can be chosen in order to enable more rapid convection.

Heat transfer could also be improved by rifling the inner wall of the fuel tube or adding baffles to deflect convective flow from the vertical to the horizontal direction. The ratio of length to diameter of the fuel tube, roughness and/or structure of the inner wall may affect the effectiveness of heat transfer and can all be optimised for any particular reactor configuration by standard methods of computational fluid dynamics.

Figure 3:
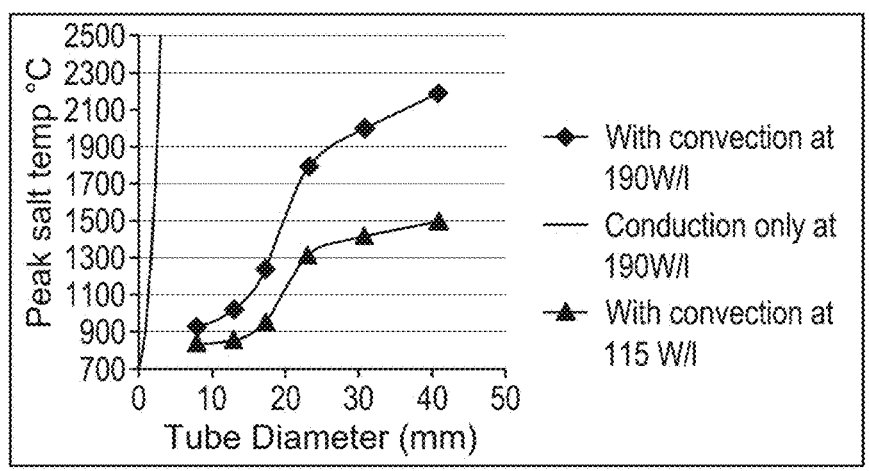
FIG. 3 shows the results of computation fluid dynamics calculations of maximum fuel salt temperatures in 2 m high vertical fuel tubes of varying internal diameters.

FIG. 3 shows the results of computational fluid dynamics calculations carried out on a smooth walled round tube of varying diameter. The molten salt had a density of 4837–1.9537T kg/m$^3$, a specific heat of 418+0.136T J/kg·K, a viscosity of 0.0259–0.00198T kg/sec·m where T is the temperature in kelvin and a thermal conductivity of 0.81 w/m·K. Two simulations are given for different levels of heat generation in the fuel salt. A further simulation is given for a similar notional molten salt with a coefficient of thermal expansion of zero which shows the maximum temperature in the absence of convective cooling. This shows the extraordinary effect of convection on heat transfer within the fuel salt and also demonstrates that for any particular geometry, fuel salt composition and power level, there is a range of diameters of the tubes where changes in diameter or in power level have relatively little effect on the maximum temperature reached by the molten salt. Tube diameters in that range have advantages that are significant in certain embodiments of the invention.

FIG. 4 shows a fuel tube according to one embodiment, where the fuel tube contains baffles 400, perforated at the centre, which divide the fuel tube into segments 401 in order to improve the convection of the fuel salt, e.g. segments 401 with height substantially the same as, or at least of a similar order to, the diameter of the fuel tube. Convection within the segment carries heat more efficiently to the wall of the fuel tube while the perforation aids filling and emptying of the fuel tube and allows mixing of the fuel salt between different segments.

The fuel tubes may be arranged such that the critical region of the tubes is approximately horizontal. A slight slope may be required in order to allow off-gassing of fission products. Arranging the fuel tube horizontally reduces the vertical size of the convection cells, reducing the time taken for fuel salt at the centre of the tube to reach the edge. An example fuel tube according to this embodiment is shown in FIG. 5. The fuel tube may be formed into a shallow helix 501 with a circular 502 or oval 503 cross section. Because the tube is slightly sloped, any evolved gasses will rise to the top of the helix, and material may be added from the top of the tube as with the straight fuel tubes.

The reactor design also permits limited boiling of the fuel salt in the hot centre of the fuel tube to drive convection and create mixing. In this option, it would be desirable for the fuel salt to fill only the lower part of the fuel tube leaving a helically constructed upper part of the fuel tube to act as a condenser for any vapour escaping from the fuel salt. This configuration of the reactor would permit use of a fuel salt melting at a relatively high temperature provided that the vapour produced from that fuel salt melted at a lower temperature than the working temperature of the coolant so that it condensed as a liquid which would run back into the fuel salt. Inclusion of up to about 40% of zirconium halide in the fuel salt is one of several effective ways to achieve this.

Heat transfer from the fuel salt to the wall of the fuel tube can also be increased by use of the oscillatory baffled column system. There are many possible configurations of such columns. The baffles may be designed such that the motion of the baffles is not impaired by the deposition of fission products, e.g. by ensuring adequate separation of moving surfaces which are immersed in the fuel salt.

FIG. 6 shows an embodiment of an oscillatory baffled column where a series of baffles 601 is inserted into the fuel tube, optionally in the form of a helix or a series of perforated plates 602, with the baffles being mechanically driven up and down in a vertical direction, e.g. by a mechanical actuator 603. The eddy mixing created by the movement of the baffles increases heat transfer from the fuel salt to the fuel tube wall.

Another embodiment of oscillatory baffled column is to form the fuel tube into a U shaped tube 701 with both ends of the tube anchored in the lid of the reactor tank as shown in FIG. 7. Oscillating gas pressure 700 is applied to one or both ends of the U shaped tube 701 to create an oscillating motion of the fuel salt within the tube. In one embodiment, the frequency of oscillation of the fuel salt is matched to the resonant frequency of its oscillation so as to achieve maximum movement with minimum applied gas pressure. The efficiency with which the oscillating motion of the fuel salt is converted to greater heat transfer to the fuel tube wall can be increased by including baffles of varying shapes in the fuel tube, by corrugating the wall of the fuel tube or by other methods. In contrast to conventional pumped fuel tubes, the oscillation allows the fuel salt to be kept within the core, and does not require it to be passed through a pump or external heat exchanger.

It will be appreciated that the use of U shaped fuel tubes without oscillating flow and with baffles being optional is also possible. Such tubes have the advantage of simpler manufacture as closure of the end is not required. If the tubes have narrower sections where they are attached to the lid of the reactor, those narrower sections can be intertwined in a helical manner to prevent neutron passage up the tube. A narrower region at the bottom where the tube bends back on itself is also advantageous as it can increase strength and reduce the resistance to flow of coolant into the bottom of the fuel tube array.

Figure 8:
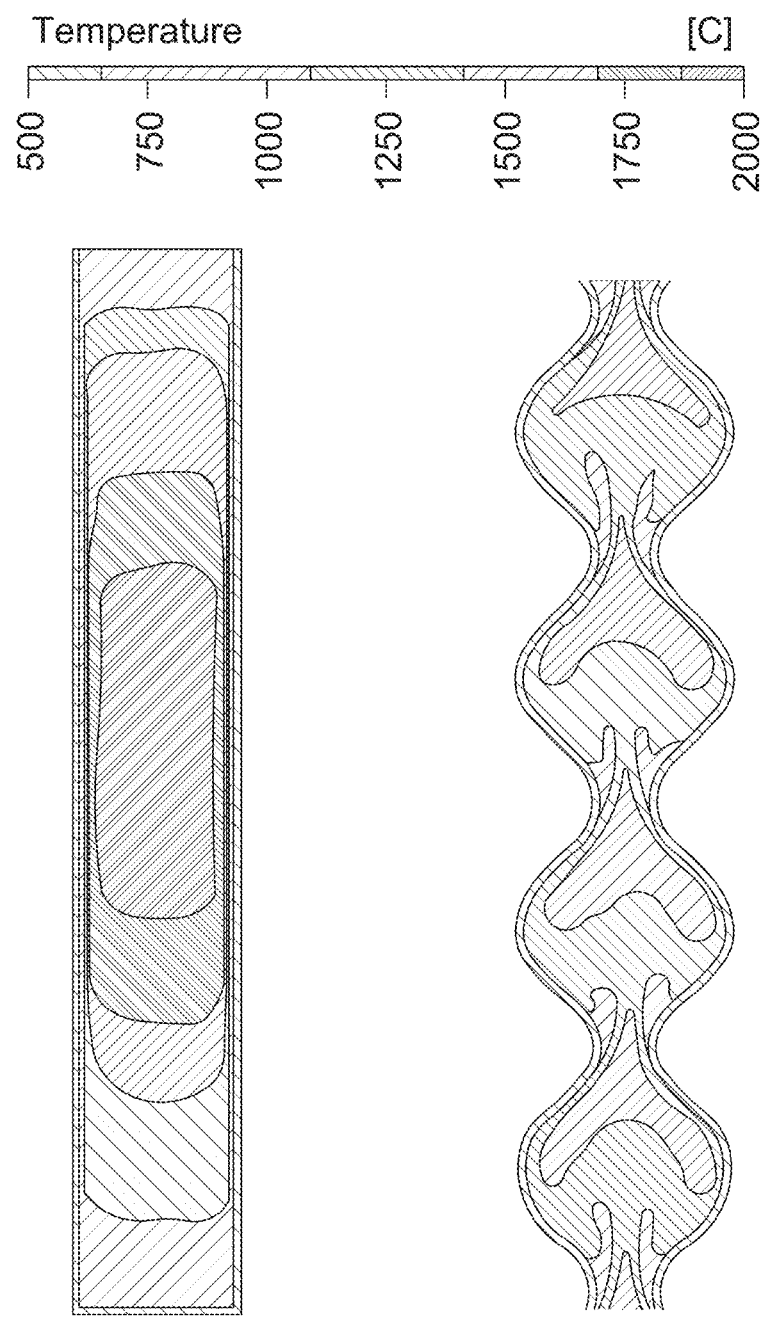
FIG. 8 shows a corrugated fuel tube demonstrating the effect of corrugation in lowering fuel salt temperature when compared to a straight walled tube: each tube is of the same maximum diameter and the fission heat production per ml is constant.

Corrugation of the external fuel tube wall also enhances transfer of heat from the fuel salt to the fuel tube wall as shown in FIG. 8.

Figure 12:
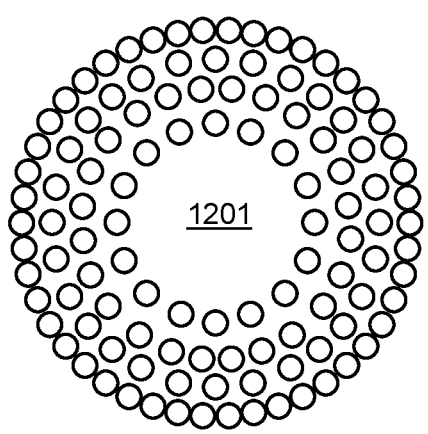
FIG. 12 is a plan view of a core of a molten salt reactor.

The neutron flux across any reactor core is inevitably higher at the centre of the critical region than it is at the edges. A particular advantage of this reactor design is that the effect of this uneven neutron flux on fission rates and hence heat production can be mitigated in a number of ways. For example, the spacing of the fuel tubes can be wider at the centre of the array than at the periphery, as shown in plan view in FIG. 12. Tubes at the periphery can also contain fuel salt with a higher concentration of fissile and/or fertile isotopes. In one embodiment the fuel tubes form a cylindrical array with a diameter similar to the height of the wide region of the fuel tube, with tubes spaced more widely at the centre of the array with, optionally, an empty zone 1201 at the centre of the array so that the array forms an annulus.

In another embodiment the spacing of fuel tubes is uniform but selected tubes towards the centre of the array are left empty of fissile material.

The neutron economy of the reactor and the uniformity of neutron flux across the core region can also be improved by placing a neutron reflector around the array of fuel tubes so that neutrons lost from the core region may be reflected back into it. The neutron reflector can conveniently be combined in a structure that constrains flow of the coolant to a circuit including the heat exchanger and the fuel tube array. The same structure can support turbines to accelerate the natural convective flow of the coolant and can be arranged so as to be easily replaced by lifting it out of the reactor tank as a single unit or a set of segments forming a complete ring around the fuel tube array.

Figure 13:
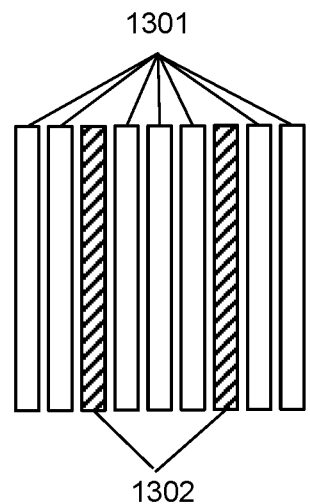
FIG. 13 is a diagram of a core of a molten salt reactor.

The reactor as described above is a fast neutron reactor with only limited moderation of the neutrons by the relatively heavy nuclei of the fuel and coolant salts. Epithermal and thermal configurations of the reactor are also possible through incorporating moderating material such as graphite into the reactor core. This can be achieved for example as shown in FIG. 13 by replacing some fuel tubes 1301 with graphite tubes 1302 or building a solid graphite core perforated by channels somewhat wider than the fuel tube diameter into which the fuel tubes are inserted so that a gap is left between the fuel tube wall and the graphite through which the coolant salt circulates.

Construction Materials and Temperatures

The below discussion of materials and temperatures is by way of example only, in order to illustrate the technical considerations in the selection of such materials. Any specific materials disclosed should not be taken as limiting the scope of the attached claims in any way.

Choice of Molten Salts

Most molten salt reactor designs utilise lithium salts due to their low melting points. In the reactor disclosed lithium is ideally avoided as it produces substantial $^3$H on neutron irradiation—even if purified $^7$Li is used. $^3$H in molten salts readily penetrates metals and would therefore contaminate the steam in the boiler tubes, with costly containment and engineering consequences.

Avoiding lithium has other advantages. The cost of purified $^7$Li is unclear (but certain to be high) and facilities for the isotopic purification of lithium are subject to major regulatory constraints.

An example of a suitable blanket salt would be a eutectic mixture of 10% NaF/48% KF/42% ZrF$_4$ which has a melting point of 385° C. and would usefully operate across a temperature range of 450-900° C. Such a mixture has a relatively low viscosity, only slightly higher than water, which improves the convective flow of the blanket. There are many other options for coolant salts, including use of chloride salts that have lower melting points.

Salts of fertile isotopes such as $^{238}$uranium or $^{232}$thorium can also be included in the coolant salt. One example among many others of a suitable fertile coolant salt would be a eutectic mixture of thorium tetrafluoride and sodium fluoride.

The fuel salt must be capable of dissolving substantial amounts of salts of fissile material (e.g. uranium or plutonium). It must be usable at temperatures significantly higher than the coolant salt but if the fuel salt occupies the subcritical region of the fuel tubes, the fuel salt should have a melting point not substantially higher than the working temperature of the coolant salt, in order that the fuel salt does not freeze in the cooler parts of the fuel tube. If the fuel salt does not occupy the subcritical region of the fuel tubes then it should preferably release a vapour which condenses to a liquid rather than a solid at the working temperature of the coolant salt.

More effective convection of the fuel salt in the fuel tube can be achieved if a fuel salt is selected that has a large coefficient of thermal expansion. The greater buoyancy achieved from heating of such liquids allows either wider diameter fuel tubes to be used or less use of devices such as corrugation, baffles, ridges, oscillating flow, internal helical baffles etc. to achieve adequate convection.

Figure 10:
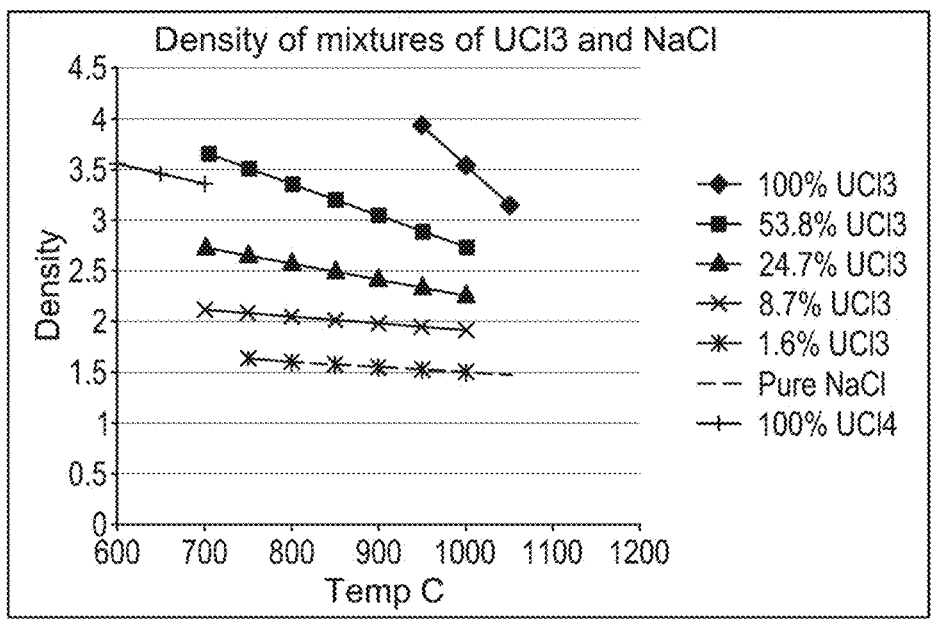
FIG. 10 shows the thermal expansion of $UCl_3$ mixtures compared to that of other molten salts including pure NaCl and pure $UCl_4$ (data from G. J. Janz, Journal of Physical and Chemical Reference Data, vol 17, suppl 2, 1988)
Figure 9:
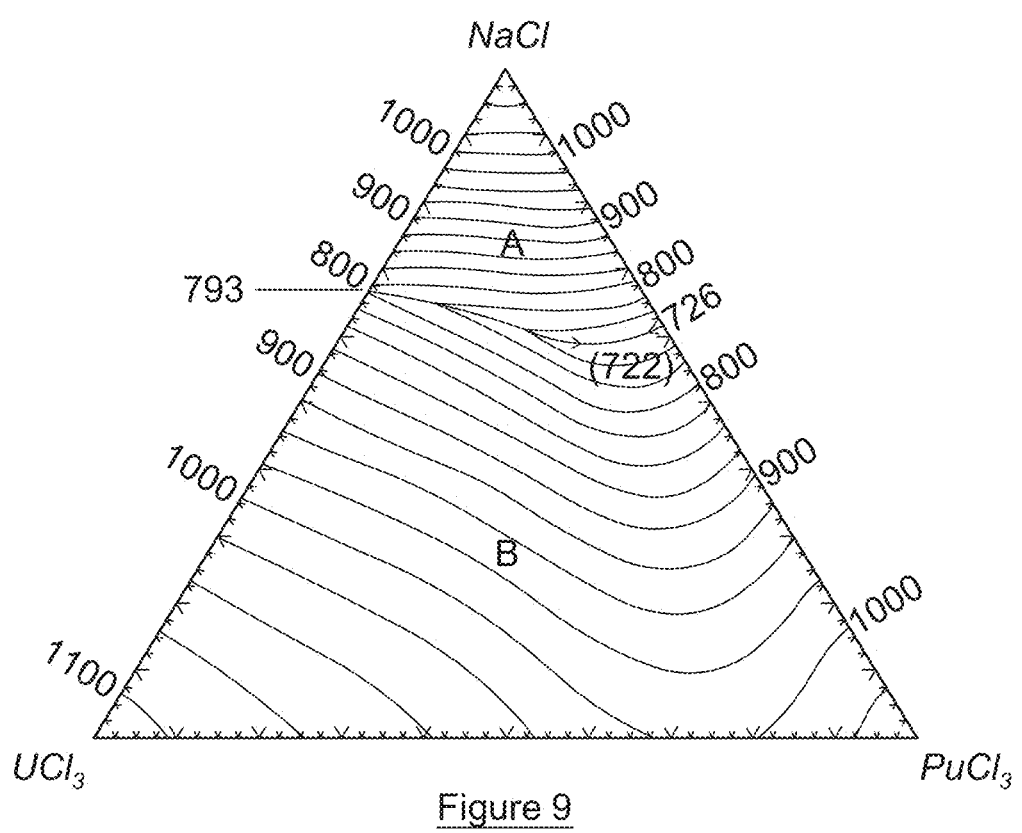
FIG. 9 shows the melting point of solutions of NaCl, $UCl_3$, and $PuCl_3$.

NaCl forms liquids containing 30-35% UCl$_3$/PuCl$_3$ and 60-65% NaCl melting at from 450-520° C. as shown in FIG. 9 (temperatures in diagram in ° K). As such these allow for inclusion of a wide variety of uranium, plutonium and other actinide chlorides at quite high concentrations. It is also possible to use mixtures of UCl$_3$ and PuCl$_3$ with little or no added NaCl. Mixtures containing high UCl$_3$ concentrations exhibit particularly high thermal expansion as shown in FIG. 10.

The nuclear interactions of the salts must also be considered. The main interactions for $^{35}$Cl are the (n,p) producing $^{35}$S, the (n,a) producing $^{32}$P and the (n,γ) producing $^{36}$Cl. The first two have moderately low cross sections for fission neutrons (96 mb and 56 mb respectively) and produce short lived isotopes that do not present significant disposal problems. The (n,γ) reaction producing $^{36}$Cl has a very small cross section for fast neutrons (1 mb) but the product is long lived and would require safe disposal or reuse of chloride salt at the end of its useful life. Use of chloride salt isotopically enriched with $^{37}$Cl is an option whereby the chloride salt can be improved for use in the reactor with less neutron absorption and less long lived radioactive waste production.

Fluoride salts are substantially more favourable neutronically than chloride salts. Mixtures of UF$_4$/NaF/KF with up to 30% UF$_4$ have melting points around 550° C. which would make them suitable for fuels comprising natural uranium enriched in 235 uranium or 233 uranium bred from thorium Use of fluoride salts of plutonium or mixed transuranics from spent fuel is more challenging however. Plutonium is only stable as the trifluoride and mixtures of this with NaF are liquid only above about 800° C. Even allowing for modest melting point depression by adding KF and UF$_4$ to the mixture this would make freezing of the salt in the narrow part of the fuel tube likely. Inclusion of low concentrations of plutonium in a fluoride salt mixture is possible but achieving critical mass using only plutonium as the fissile isotope would be challenging.

A minor modification to the fuel tube design would however make use of such high melting salt mixtures practical. If the tube was only partially filled with fuel salt, filling only most of the wide part, then convective mixing of, and continual fission heat production in, the fuel salt would be expected to prevent freezing of the fuel salt. In this arrangement, it would be desirable to adjust the composition of the fuel salt so that any vapour produced would condense to a liquid, rather than a solid, in the upper part of the tube. This could be conveniently achieved by including approximately 20% ZrF$_4$ in the fuel salt though many other options exist including incorporation of low concentrations of chloride salts Fission may cause a net release of halogen from the fissile fuel salts, with the fission products only neutralising part of the released halogen. Left alone, the accumulated halogen will attack most fuel tube materials and will result in the volatilisation of other halogen fission products such as iodine.

Two principle ways can be used to neutralise the excess halogen. First is to use as fuel salt the trichlorides or trifluorides of the fissile and fertile isotopes. Uranium trihalide will react with excess halide to produce uranium tetrahalide which is compatible with most fuel tube materials. Second is to include small amounts of metal of intermediate reactivity with halogens (intermediate between the actinides and the fuel tube material) in the fuel tube or salt which will react with excess halogen while not being so reactive as to reduce the fissile or fertile halides to their metallic form. Suitable metals include niobium, titanium and nickel which could be incorporated as solid particles in the fuel salt or as plating on the inside wall of the fuel tube or as constituents of baffle structures inserted in the fuel tubes.

Fuel Tube Material

The fuel tube represents the major materials challenge for the reactor. It must be resistant to corrosion by both fuel and blanket salts and must tolerate the high neutron flux existing in the core.

The material does not however have to survive for the life of the reactor. Fuel tubes are readily removed and replaced and would probably need to be replaced at least every 20 years for reprocessing of the fuel. The materials challenge is therefore substantially less severe than would be the case for a permanent reactor component.

There are a number of advanced materials such as metal composites and SiC$_f$/SiC composites that might have excellent properties for fuel tubes but all these are technologically immature. Use of such materials would slow down the development process for the reactor, but may be suitable for future implementations.

Two mature technologies that could be considered are C$_f$/C composites and refractory metals, for example nickel or molybdenum, and their alloys.

C$_f$/C composites have excellent chemical resistance to molten salts, though at very high temperatures UCl$_3$ can react with carbon to produce carbides. They are however subject to severe loss of strength at high neutron doses and would therefore need replacing regularly—perhaps every 2-4 years. The cost of this programmed replacement may however be compensated for by the superior neutron transparency of carbon compared to other fuel tube options. Carbon based fuel tubes are especially attractive where fertile isotopes are included in the coolant salt since they allow for less parasitic capture of neutrons by the fuel tube material and hence superior breeding of fissile isotopes. In such a reactor it is likely that shorter fuel tube life would be acceptable as more frequent reprocessing of the fuel salt would also be desirable.

When considering metals for the fuel tubes two factors dominate the choice—resistance corrosion and physical strength at high temperatures. It is useful to consider the physical strength requirements in a little detail as the requirements are far less stringent than normally considered for structural use of a metal.

One of the characteristics of the fuel tubes is that they experience minimal mechanical stress. The tubes hang from clamp fittings in the reactor lid with most of weight of the tube supported by the blanket salt, which also effectively insulates it from shocks. Lateral flow of the blanket salt at the thin region of the tubes is not expected to exceed 1 m/s which would exert only low lateral force on the tubes. What lateral force the moving blanket salt did apply would largely result in a bending moment where the tube is anchored to the reactor lid. At that location the metal is cooler and protected from neutron flux, which improves its physical strength and longevity considerably. Finally, the tubes do not have to support any pressure differences and the outer surface of the tubes will be cooled to below about 700° C. by the blanket salt, thereby minimising overall heat softening of the metal.

These very modest physical requirements may make alloy selection relatively non challenging. There is a substantial literature on both nickel and molybdenum alloys but the minimal strength requirements of the fuel tubes might even make use of the pure metals practical. The choice of metal may be dictated by the maximum fuel salt temperature to which they could be exposed. Detailed calculations of thermal and fluid flows within the fuel salt are required to determine what those maximum temperatures are likely to be. Molybdenum alloys may be usable up to 1500° C. which is well above any expected fuel salt temperatures.

Control of corrosion is important. The chemistry of the blanket salt would be essentially constant and could readily be adjusted to the optimum redox state to maximise the alloy life. A simple way to do this would be to include samples of zirconium metal in the coolant salt which would reduce any oxidising species introduced, and in particular would trap any oxygen from water or air that dissolved in the coolant salt in the form of insoluble zirconium oxide. The relatively low temperature of the blanket salt would also make corrosion control straightforward.

Control of corrosion from the fuel salt is rather more complex. Fission results in the creation of a complex mix of elements ranging in redox potential from caesium to iodine. Halogen released from fissioned actinide halides may or may not be fully neutralised by reactive metal fission products. Detailed material evolution calculations are required to establish the nature of the chemical corrosion challenge and if there is a need for systems, such as the inclusion of moderately reactive sacrificial metals in the fuel mix, to manage that challenge. Use of trichlorides or trifluorides of uranium in the fuel salt would also provide a large capacity to absorb any net release of halogen in the form of tetrahalides.

Boiler Tubes

The boiler tubes are exposed to maximum temperatures in the region of 600-700° C. Since the steam temperature within them would be about 350° C. and they would be somewhat protected from the full temperature of the blanket salt by a boundary layer of cooler salt, that is comfortably within the capabilities of existing nickel alloys. Such alloys are already used for boiler tubes within coal fired power stations where they are exposed to far more aggressive conditions (including a complex mix of molten salts condensed from the fireball).

Nonetheless, the boiler tubes are likely to have a shorter life than the reactor—if only from the effects of "steam side" corrosion. They can however be made in modular format allowing relatively easy replacement.

Reactor Tank

The reactor tank is one of the few permanent components of the reactor since both fuel tubes and boiler tubes are replaceable on a lift out/drop in basis. There may be a primary containment vessel above the tank filled with inert gas and containing mechanisms for off gas collection/pumping and fuel tube/boiler tube replacement.

By way of example, a steel tank lined with graphite or carbon composite would have the necessary physical and chemical resistance for the reactor tank. Its lifetime would ultimately be determined by its exposure to neutron flux which embrittles the steel and eventually disintegrates the carbon.

Protection from neutron flux is therefore most desirable and this is considered below. Provided neutron protection was adequate, a reactor life of a century is a realistic prospect.

Neutron Flux

Neutrons escaping from the core region represent a significant screening challenge. If allowed to reach the boiler tubes they could cause embrittlement which would be a serious issue for high pressure tubes. If they reached the reactor tank wall, similar embrittlement of the steel and swelling of the carbon lining would limit its effective life.

Building neutron absorbing shielding into the reactor is one option for dealing with the excess neutrons but would increase the complexity of the design.

Another potentially attractive option is to include a "non-burnable" neutron absorber in the blanket salt. Hafnium is a classic non burnable poison as most of its isotopes transmute into other stable neutron absorbing isotopes on absorbing neutrons. Hafnium is also a major contaminant in zirconium ores and has almost identical chemical properties. Preparing hafnium free zirconium is difficult and expensive which is why reactor grade zirconium is about ten times more expensive than "normal" zirconium metal. In one embodiment, such a neutron absorber would have a low neutron absorption for fast neutrons, thereby not reducing the neutron economy in the fuel tube array where the neutron spectrum is fast, but which has significant absorption of slower neutrons so that it effectively absorbs neutrons escaping the fuel tube array before they reach the permanent structures of the reactor.

This therefore opens up the opportunity to simultaneously save substantial cost and provide effective neutron screening by simply using cheap, hafnium contaminated, zirconium tetrafluoride in the blanket salt.

The optimum level of hafnium in the blanket salt would need to be calculated based on neutron scattering, moderation and absorption in the blanket salt. There will be a trade-off in the level to be used since blanket salt passes through the core region and the presence of a neutron absorber in the blanket salt would reduce the core neutron economy (albeit only marginally) and therefore somewhat increase the initial fissile inventory.

Control Systems

Conventional reactors use control rods to offset the initial excess reactivity of their fuel rods. Continuous monitoring of fission rate through neutron detectors inside and outside the core is necessary to control local transients which can lead to overheating.

The reactor disclosed herein requires no such control systems. The fuel tube array contains just sufficient fissile fuel to be critical at its design temperature in the reactor. As the fuel heats it expands with a coefficient which may vary from approximately $3\times10^{-4}$ up to $2\times10^{-3}$. A 100° C. temperature increase thus decreases the concentration of fissile material within the core region by 3-20% which is more than sufficient to quench the chain reaction. If fuel salts such as $UCl_3$ are used, the thermal expansion coefficient approaches the upper end of the range given, giving the reactor yet greater stability.

The basic physics of the reactor therefore maintains the temperature of the fuel at an almost fixed average temperature irrespective of the rate at which heat is transferred from the fuel to the blanket. The reactor power level is hence effectively controlled by the rate of heat withdrawal through the boiler tubes in the blanket salt. If heat withdrawal ceased then the fuel would heat and expand until the rate of fissions fell to a level just sufficient to maintain the new, higher, fuel temperature against any remaining heat loss from the reactor.

Figure 14:
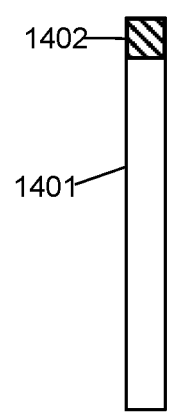
FIG. 14 is a diagram of a fuel tube.

The primary reactor monitoring system may be a set of temperature sensors, e.g. as schematically shown in FIG. 14, spectral temperature sensors, built into the tube cap assemblies 1402. These would monitor the temperature of the fuel salt in each fuel tube 1401. As fissile material was consumed and fission products accumulated in the fuel tubes, the temperature of the fuel salt in the tubes would fall, the salt would contract, fissile isotope concentration would rise and the chain reaction would continue.

Another option for the temperature sensor is to measure the expansion of the fuel salt. This can be done in several ways but a simple one is to measure the resonant acoustic frequency of the gas column in the tube between the tube cap and the surface of the fuel salt. This method would be particularly useful where the upper portion of the fuel tube was non-linear.

A number of neutron absorbing or moderating control rods may be included in the design to allow a lower temperature shut down of the reactor in emergency, at decommissioning and when replacing the fuel tube array. The use of neutron moderating rather than absorbing control rod material is made possible by the presence of strong absorbers of slower neutrons, such as hafnium, in the blanket salt, though a control rod structured with a moderating core surrounded by a periphery of strong neutron absorber might be preferable Alternatively, control rods could be entirely dispensed with. In an emergency a large quantity of a strong fast neutron absorber could be added to the coolant salt. One example would be europium fluoride. In order to quench the chain reaction during refuelling or decommissioning, half of the fuel tubes could be partially raised from the tank, leaving the fuel filled portion immersed in the coolant salt. The increased volume of the region of the reactor containing fuel salt would result in its becoming subcritical.

An important aspect of control systems is their operation during reactor start up. It is normal to hold a reactor subcritical with control rods until fuelling is complete and then to very slowly withdraw the control rods. Too rapid a withdrawal can trigger a prompt critical event which can be disastrous. A similar system could be used in the Simple MSR with one or more control rods that were completely withdrawn at the conclusion of the start up sequence.

However, it would be possible to dispense with control rods at start up by adding fuel tubes progressively to the core until criticality is reached, then continuing to add more fuel tubes until the design fuel salt temperature is reached. It is vital to avoid prompt critical events during this process due to too rapid insertion of reactivity into the reactor core. The potential for prompt criticality can be reduced by one of more of the following steps.

A neutron source can be incorporated into the core so that the core rapidly generates heat when it reaches a delayed critical state instead of having a potentially long lag time while the neutron flux builds up. This can be conveniently done by incorporating higher actinides such as $^{244}Cm$ from spent nuclear fuel into the fuel salt.

A fuel composition with a delayed high neutron fraction can be used. This would entail use of $^{235}U$ rather than just $^{239}Pu$ and/or incorporation of $^{238}U$ in the fuel, which has a particularly high delayed neutron fraction when fissioned by fast neutrons.

The fuel tubes can be added at startup first as a central, subcritical central core set and then as a peripheral set building up from the outside of the core inwards. That would ensure that when the final fuel tube needed to create criticality was added it was some distance away from the main central fuel tube group so the reactivity insertion was quite small and therefore safe. The gap between the inner and outer group of fuel tubes would then be filled with fuel tubes causing the core to achieve its design fuel salt temperature when the annulus was filled.

An alternative start up procedure would be to preheat the coolant salt to a relatively high temperature and then build up the array of fuel tubes. The high temperature would expand the fuel salt rendering the core subcritical. When the core was assembled, the coolant salt could be slowly cooled allowing the core to approach criticality in a slow and controlled way.

Fuel Choice and Refuelling/Reprocessing System

It is a characteristic of most molten salt reactors that they have great fuel flexibility. This reactor is no exception and could be fuelled with, for example, plutonium, enriched uranium or mixed transuranic actinides from waste conventional reactor fuel.

Top up of the fissile material in each tube as fissile material was consumed during reactor operation would be practical though it would represent a relatively mechanically complex system in the reactor.

A safe, easily monitored and audited fuel handling system would be to have fuel pellets (simply frozen molten salts) loaded into a radiation screened cartridge system at a central secure processing plant. The cartridge would be mounted at the reactor into a mechanism that would track over the array of fuel tube caps, lock onto the relevant one and discharge single fuel pellets into that fuel tube.

The fuel salt may, by way of example, contain approximately 30-35% total actinide chlorides, of which most may be fertile $^{238}U$. Consumption of the fissile isotopes during reactor operation would tend to reduce the power output resulting in the fuel salt cooling and contracting, thereby maintaining its critical mass. Production of new fissile isotopes from fertile isotopes in the fuel salt could maintain the levels of fissile isotopes and thereby the reactor power output. If such "breeding" was insufficient to maintain the power output then the fuel tubes could be topped up by adding small amounts of fresh fissile material to each tube through its cap assembly. An alternative to this option would be to add fresh fuel tubes in addition to those already in the reactor either at the centre of the array in the annular space or around the periphery of the array. Where the core has been designed with tubes lacking fissile material towards the centre of the tube array, those tubes could be replaced with tubes containing fissile material as the reactor burns its initial fissile load.

In general, but particularly where the fuel salt is chosen to have a large coefficient of thermal expansion, substantial cooling of the average fuel salt temperature due to consumption of fissile material can be tolerated. The resulting large contraction of the volume of the fuel salt maintains criticality of the core with only acceptable net loss of power output. Examples of such fuel salt compositions are 85% $UCl_3$/15% $XCl_3$ where X represents mixed plutonium, americium, curium and trace higher actinides from reprocessed nuclear fuel.

A further option for fuel salt is to use a mixture of low enriched uranium and plutonium trichlorides as the fissile fuel. Both $^{235}U$ and $^{239}Pu$ are consumed by fission but most bred fissile material is $^{239}Pu$ which has a relatively greater contribution to reactor criticality than the $^{235}U$ due to its higher fission cross section and higher fission neutron yield. The result is that a breeding ratio of less than 1.0 can nonetheless maintain the fuel salt with a critical concentration of fissile isotopes.

Yet a further option to avoid the need to add fresh fissile material to the fuel tubes would be to incorporate a removable neutron absorber in the coolant salt which can be removed progressively as fissile material is consumed. One option would be cadmium fluoride which could be easily removed from the coolant salt by electrolytic reduction or reduction by addition of a reactive metal such as sodium. The resulting metallic cadmium would be molten at reactor temperatures and could either be removed or allowed to accumulate at the bottom of the tank.

Still a further option would be to incorporate neutron absorbing control rods in the reactor core which could be gradually withdrawn as fissile material was consumed.

In the event that the reactor operated as an "over breeder" producing more fissile material than it consumed and therefore causing power output to increase, the selective removal of individual fuel tubes could be used to bring the reactor back to its design power level.

Accumulation of fission products can become the limiting factor dictating reprocessing intervals in molten salt reactors. Fast reactors like the one disclosed herein are relatively resistant to the problem of neutron poisoning by fission products but when fission products reach their solubility limit in the fuel salt they precipitate. That precipitation is a major problem for reactors which need to pump the salt through heat exchangers because it can lead to blockages, flow restrictions or accumulation of heat generating fission products in regions with inadequate cooling. Prevention of such precipitation can ultimately be the key factor determining the maximum possible reprocessing period. In the reactor disclosed herein however where fuel salt is not pumped or piped, precipitated material would have little effect whether it was carried dispersed in the fuel, plated out on the fuel tube wall or accumulated as a deposit at the bottom of the tube. In the case where the fuel salt is mechanically agitated, moving parts which are immersed in the fuel salt can be designed such that surfaces that move relative to each other do not approach closely enough that deposition is likely to be a problem over the lifetime of the reactor.

Off Gas System

Most designs of molten salt reactors have relatively complex off gas systems with helium sparging of the fuel, separation of foamed noble metals and filtration and processing of the evolved gasses. Particular attention has to be paid to tritium which is produced in quite large quantities from the lithium salt used, even if expensive 99.995% $^7LiF$ is used.

A very much simpler system can be used in the reactor disclosed herein. Because the neutron spectrum is fast, neutron poisoning by $^{135}Xe$ is not a significant problem (the neutron cross section falls from 2,700,000 barns for thermal neutrons to 7600 barns for neutrons in the slowing down region and to virtually zero for fast neutrons). Rapid removal of Xenon is therefore not necessary either to improve neutron economy or to prevent reactivity excursions due to changes in power levels.

Xenon and Krypton can therefore be allowed to build up to saturating concentrations (about $10^{-5}$ mol/l) in the molten fuel and then to spontaneously bubble out of the fuel salt. In an exemplary design, the rate of noble gas production at full power would saturate the fuel in 30 minutes. The resulting flow of noble gas from each fuel tube would be about 13 ml per day at NTP or about 50 ml/day at reactor temperature. A gas space above each fuel tube of about 500 ml would give an average residence time of evolved gas in the fuel tube of 10 days which would allow most highly radioactive isotopes to decay within the fuel tube.

Other volatile fission species would be limited. Tritium would be produced only by rare ternary fission events but very small amounts would be carried from the fuel salt as HF by the evolved noble gasses. Volatile chlorides such as $ZrCl_4$ would have low but not insignificant vapour pressures over the hot salt and small amounts may therefore be carried with the noble gas stream. Iodine might form mixed halides with $UCl_3$ or react with a scavenging metal included in the fuel mix. Small amounts might however be carried with the noble off gas stream.

Overall, an entirely passive off gas system would be adequate and would require only simple nickel alloy tubing leading to a condenser/absorber to collect the off gas products. Accelerating the off gas process with a helium flow would be unnecessary and in fact undesirable as it would result in evaporative loss of fuel salt over time with consequent deposition of radioactive material in the tubes of the off gas system.

The off gas system can be conveniently combined with the system of oscillating gas pressure described hereinabove.

Reactor Safety

The basic physics and chemistry of the reactor design give it a very high level of intrinsic safety.

Some of these factors are common to all molten salt systems

- The strong negative feedback due to thermal expansion of the fuel shuts down the chain reaction automatically in the event of overheating.
- Control rods are not needed (except possibly as a backup should it be necessary to shut down the reactor) as there is no excess reactivity in the reactor.
- The fuel and fission products are in physically and chemically stable forms which would react neither with water nor air to significant degrees in the event of containment failure.

Volatile fission products are continuously removed for safe storage and decay so that volatile radioactivity resulting from any containment failure would be minimal.

Some are common to most fast neutron reactors

Xenon transients will not be significant during changes in power output since the reactor operates on a fast neutron spectrum and the concentration of xenon in the fuel will be constant at its saturating concentration under all load conditions.

Some are common to "pool" type reactors

Primary cooling of the core is by passive convection so that even a complete failure of the secondary coolant system would not result in rapid core overheating. The huge pool of molten blanket salt would be capable of absorbing residual decay heat from the core for many hours before auxiliary cooling would be needed, if indeed it ever was.

Some are unique to this design

The efficient neutron absorption by the blanket salt results in minimal exposure of reactor structures to neutron flux; hence the reactor structures do not become highly radioactive nor experience physical degradation.

Any failure of a fuel tube, or indeed of all the fuel tubes simultaneously, would result in the molten fuel mixing with the large excess of neutron absorbing blanket salt. That would instantly quench the chain reaction while providing a large heat capacity to absorb decay heat from the fission products.

All molten salts, at all times, are immersed in the large pool of blanket salt. Freezing of salt in a pipe or heat exchanger in the event of pump failure etc. is therefore not possible and a single heating system can be used to melt the salt at startup and keep it molten during down time. That single heating system represents a substantial simplification compared to other molten salt reactor designs.

All fuel salt is located within the reactor so that loss of delayed neutrons that are emitted outside the core region is minimised. This substantially increases the reactor stability and resistance to "prompt critical" power excursions.

One potential danger intrinsic to the design relates to the presence of the boiler tubes within the reactor tank. It would be essential to establish that rupture of one of those tubes would not result in a dangerous accident.

Steam reacts rather slowly with $ZrF_4$ at the temperature of the blanket, with a Gibbs free energy of about zero. The bulk of the steam would therefore discharge into the head space above the molten blanket salt with a small amount of HF and $ZrF_4$ vapour included. A pressure release system, discharging into a suitable reservoir would therefore need to be included in the design of the reactor lid, together with automatic shutdown of water pumps in the event of pressure loss (a normal feature of boiler systems).

Capital Costs of the Reactor

Accurate capital cost estimates are of course far beyond the scope of this disclosure. However, the main cost differences from conventional nuclear reactors can be highlighted and suggest that the reactor would be substantially cheaper to build. The following major differences should be considered.

Reduced containment due to the reactor's intrinsic safety

Fuel fabrication costs cut to a fraction of solid fuel rods

No high pressure radioactive system with pumps, plumbing etc.

No thin channel high efficiency heat exchangers with associated costs

Much simplified control systems with no need for multiple redundancy. No neutron detector network required.

No rapid acting precision control rod system. A small number of simple SCRAM rods is sufficient for emergencies and reactor shut down.

Potential for factory production of the nuclear island instead of on site construction.

Nuclear Industry Infrastructure

The new nuclear infrastructure needed for a fleet of reactors according to the present disclosure is relatively modest and should cost a small fraction of the cost of the current infrastructure. In the long term it would therefore be a sound investment if it made possible nuclear electricity production that was price competitive with fossil fuels. The infrastructure would also support a lucrative export market in reactors if the ambition of producing power at lower cost than fossil fuels could be realised.

Fuel Production and Purification

Fuel for the reactor is simply salts of the fissile isotopes. No manufacturing of fuel rods is involved and relatively low purity of the fissile material is acceptable. In the UK it would be reasonable to initially use the 100 tonne stock of plutonium dioxide currently accounted for as having zero net value. On the basis of figures for the MSFR design, the UK plutonium stock would be sufficient to fuel perhaps twenty 500MWe reactors. A plant capable of 10 tonne per year production would allow two reactors per year to be fuelled and would be of very modest size.

In the longer term, actinide waste from existing stocks of uranium/plutonium oxide fuel could be used as feedstock. It may be economical to use existing reprocessing facilities for this, though the process could be substantially simplified as lower purity is acceptable, but electrolytic pyroprocessing would probably be cheaper and more efficient for new plant.

Fuel Salt Reprocessing

Reprocessing of fuel salt from the reactor would be infrequent, perhaps only after 10-20 years, although more frequent refuelling may be necessitated by the lifetime of the fuel tubes. Used fuel could in fact be stored in much the same way that current used fuel is stored but reprocessing to separate the remaining actinides from the fission products and used salt would be relatively straightforward since significant contamination of the recovered actinides with fission products is perfectly acceptable for reuse of the actinides.

Breeding Configuration

It is likely that the reactor will contain fertile isotopes in the fuel salt with the result that new fissile material is bred continually during operation. This happens in most nuclear reactors. The present reactor has the potential to be a more effective breeder of new fissile isotopes if fertile isotopes are also included in the coolant salt. The same basic reactor design can be configured as a breeder reactor, but with significant changes. The reactor would be more costly and would only make economic sense when the cost of fissile material rose significantly—as would inevitably occur if nuclear power substantially replaced fossil fuels for power generation.

Choice of Salts

The blanket salt would be an important breeding site in the reactor. Thorium would be an exemplary fertile material for a number of reasons. It is cheap, abundant and breeds to $^{233}U$ which is advantageous as a fuel because it generates far less long lived actinide waste. Thorium has a very small fission cross section even in fast reactors which will ensure minimal contamination of the blanket salt with fission products. Depleted uranium could be used instead of thorium but greater care would be needed to remove fission products from the coolant salt since $^{238}$uranium has a larger cross section for fission by fast neutrons than thorium, An example salt mixture would be 22 mole % ThF$_4$ in NaF which has a melting point of 620° C. That would necessitate having a fuel salt working temperature of about 900° C. and a similar NaF/actinide fluoride mixture would be possible as the fuel salt though a chloride based salt would still be practical and would have certain advantages as set out above.

The thorium in the blanket would efficiently absorb the neutrons escaping the core, thereby providing the same screening effect as the hafnium in the non-breeding design. The large volume of the blanket salt would require much larger amounts of thorium than most current molten salt reactor designs. However, thorium is relatively abundant and currently represents a troublesome, mildly radioactive, waste product of rare earth mining. The cost of imported thorium to the USA in 2011 varied from $27 to $250 per kg depending on purity. Even at $250 per kg, 250 tonnes of thorium would cost only £40 million.

Fuel Tube Material

The high temperature of the fuel salt in the above example would make nickel alloys unsuitable for the fuel tubes. Molybdenum alloys, or even pure molybdenum might suffice. Alternatively, C$_f$/C composites could be used with the proviso that the fuel tubes were replaced and the fuel reprocessed on a 2-4 year cycle. That timing would be consistent both with preventing tube weakening due to neutron damage and maximising breeding efficiency by removal of fission products. In the longer term less well developed materials such as metal composites and silicon carbide composites could be superior options.

Boiler Tubes

Despite the higher blanket salt temperature, nickel alloys would probably still be suitable for the boiler tubes. The large temperature difference between the steam and the molten salt would likely result in a frozen shell of salt forming around the boiler tubes. That layer would protect the tube from corrosion.

Recovery of Bred $^{233}$U

Compared to most breeder reactor configurations, this reactor has a huge volume of blanket salt. That results in the $^{233}$Pa produced from the $^{232}$Th being diluted so much that its chance of undergoing neutron capture before it decays to $^{232}$U is tiny. Separation of the $^{233}$Pa is therefore not necessary.

Figure 11:
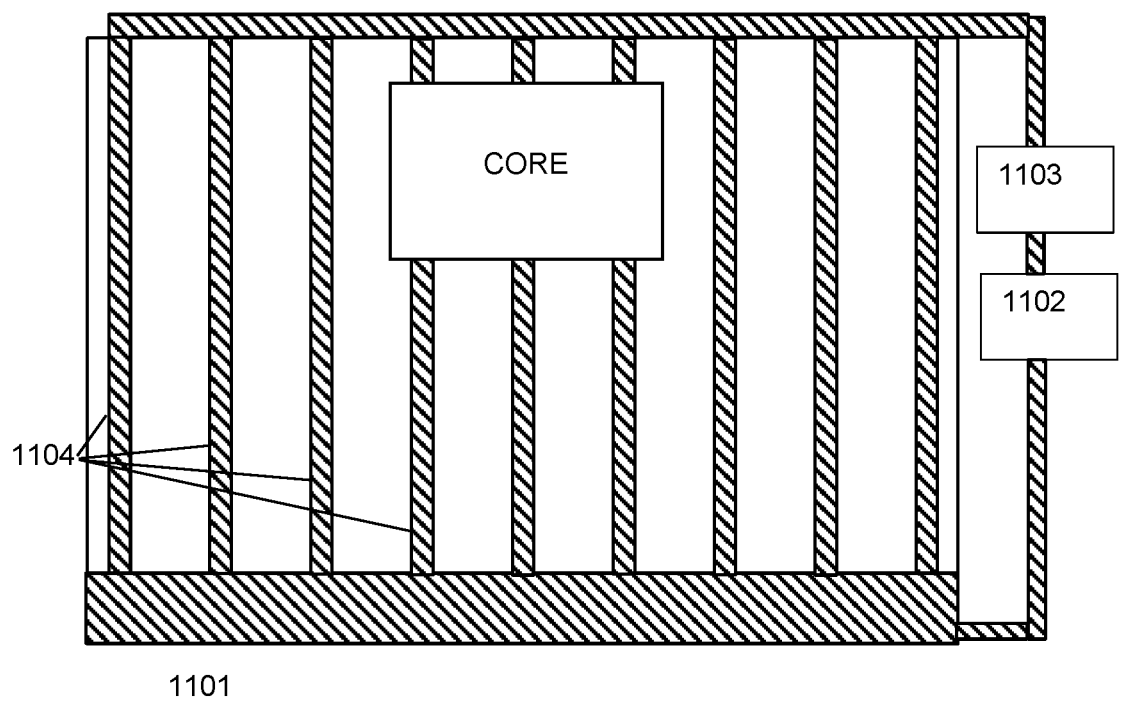
FIG. 11 is a diagram of a molten salt reactor.

Rapid recovery of the $^{233}$U is however desirable so as to avoid it undergoing fission in the blanket and thereby contaminating the blanket with fission products. There are many ways to do this but an attractive option, as shown in FIG. 11, is to include a layer of molten bismuth/thorium alloy 1101 in the bottom of the tank. Reductive extraction into bismuth of uranium by thorium is well established as a method to recover uranium from molten salts. The uranium could be allowed to accumulate for many months, protected from the neutron flux by the thorium in the blanket salt, before being recovered.

Separation of uranium from thorium fluorides by reductive extraction into molten bismuth has been well described (U.S. Pat. No. 3,577,225). Normally this is achieved by pumping the molten salt through tall columns of molten bismuth. In a reactor where the breeding takes place in a tank of molten salts, such as the reactor disclosed herein, it would only be necessary to include a layer of molten metal, such as bismuth, in the bottom of the tank with an excess of thorium metal incorporated or dispersed in the molten metal layer. Optionally, the layer of molten metal may be drawn from the bottom of the tank by a circulating system 1102, passed through a steam generator or other heat exchanger 1103, and reintroduced at the top of the tank as a spray or a number of liquid columns 1104, which fall through the coolant blanket absorbing heat. This arrangement therefore both acts as a heat exchanger, without the need for physical separation of the blanket salt and heat exchanger coolant, and improves the collection of the fissile material from the blanket.

Uranium could then be recovered from the molten metal by pumping it from the reactor and fluorinating it so that the uranium volatilised as the hexafluoride. An alternative to this conventional procedure would be to circulate the molten metal either continually or periodically through a cooling system that cooled the metal to above its melting point. Both thorium and uranium dissolved in the metal would precipitate as bismuthides or the corresponding complex with the other metal which could then be removed and processed to recover the uranium. The advantage of this process is simplicity and the avoidance of transporting or processing large volumes of bismuth or other metal.

EXAMPLE REACTOR CONFIGURATIONS

Several exemplary reactor configurations will now be described to further exemplify the principles discussed above.

Example 1

A cylindrical reactor tank is constructed from 5 cm thick steel lined on the inner surface with 10 cm of graphite tiles. It is insulated on the external side and enclosed below ground level in a concrete and steel lined pit. The dimensions of the tank are 6 m diameter by 4 m deep. The tank is filled with a coolant salt mixture composed of 40% zirconium tetrafluoride 60% sodium fluoride. The zirconium contains between 1-2% hafnium. The salt is initially melted by insertion through the reactor lid of an electric heating system that is removed when the reactor is operational.

Arrays of steam tubes are positioned in the form of 6 arrays of tubes around the internal perimeter of the reactor tank. Each array occupies 60 degrees of curvature of the tank and together they form a complete annulus of 1 m thickness. The steam tubes are formed from seamless nickel alloy tubing and are joined to feeder tubes above the tank so that no welds or joins are immersed in the molten salt. Water at approximately 300 C is pumped into the tubes and emerges as a mixture of steam and water at 350-400 C. Steam is separated in a steam drum and the steam fed back into another part of the steam tube array to superheat. The portion of the steam tube array used as superheater is positioned above that portion used to produce the water/steam mixture so that it is in contact with the highest temperature coolant salt. The superheated steam is piped to a convention steam turbine/generator set. Connections of the steam tube arrays with the steam turbines are remotely severable so that steam tube arrays can be remotely disconnected, removed from the tank, replaced with fresh arrays and reconnected to the turbine systems.

Fuel tubes are formed from 99+% pure molybdenum with a wall thickness of 0.5 mm. They have a diameter of 4 cm in the lower 1.5 m of the tube and of 1.5 cm in the upper 1.5 m of the tube. The upper 1.5 m is formed into a spiral with outer diameter of 4 cm and a pitch of 40 cm. They are secured to the lid of the reactor using a clamp fitting that has an easily and remotely released connection to a 5 mm nickel alloy tube network which is connected to a cryogenic trap to condense and store any gasses evolved from the fuel salt. Fuel tubes are arranged in a hexagonal pattern with centre to centre spacing of 5 cm in a cylindrical array of diameter 3 m. The lower 2.8 m of the tubes are immersed in the coolant salt leaving a 20 cm gas space above the coolant salt which is filled with helium.

3 m×2 cm diameter rods of zirconium metal are passed through the reactor lid into the space between the fuel tubes and steam tubes to act as sacrificial scavengers of any reactive chemicals in the coolant salt.

80% of the fuel tubes are filled to a depth (at 1000 C) of 1.4 m with a mixture of uranium chloride enriched to 5% in the 235 isotope of uranium and a mixture of plutonium and higher actinide trichlorides recovered from uranium oxide fuel rods that had been used once in conventional light water moderated reactors. Of the uranium chloride, 95% is trichloride with 5% tetrachloride. The frozen salts are packed as granules into the tubes at a central manufacturing facility and inserted into the reactor when the coolant salt is heated to above the melting point of the fuel salts, thereby avoiding the possibility of the expansion of the salts through melting causing cracking of the fuel tubes. The concentration of uranium trichloride falls from 80% in fuel tubes at the centre of the array to 70% for tubes at the outer perimeter of the array with the remainder being the plutonium and higher actinide trichlorides.

The remaining 20% of the fuel tubes are filled with the coolant salt mixture and are distributed within the array so that the proportion of coolant salt filled fuel tubes increases from zero at the outer edge of the array to 30% at the centre of the array.

Each fuel tube clamp assembly contains a temperature sensor that operates by detecting the resonant frequency of the gas column above the molten fuel salt, expansion of the fuel salt resulting in a shortening of the gas column. Fuel tubes are loaded into the reactor progressively with the temperature being monitored as further tubes are added so that the completed array of fuel tubes reaches the design temperature.

As the reactor operates and fissile material is consumed, coolant salt filled fuel tubes are replaced with fuel salt filled tubes so as to maintain the fuel salt at close to its design temperature.

The region above tank consists of a helium filled chamber of similar diameter to the reactor tank and height of 5 m. It contains a remote operated crane apparatus that can remove fuel tubes or steam tube banks and an airlock assembly to allow movement of fuel tubes or steam tube banks in and out of the chamber. The helium is continually circulated through and absorption/filtration apparatus to maintain very low oxygen, nitrogen and humidity levels.

Low pressure "burst valves" are incorporated into the reactor lid with piping to steel condenser units to allow any steam release within the reactor tank due to a burst steam tube to be vented and condensed rather than build up pressure within the reactor tank.

Example 2

The reactor is similar to that described in example 1 except as follows. It is particularly designed to be a net breeder of fissile material.

The fuel tubes are manufactured from silicon carbide fibre/silicon carbide composite with a wall thickness of 1 mm and a 50 um coating of pyrolytic carbon on each surface. The lower portion has a diameter of 20 mm and the upper of 10 mm. They are arranged in a hexagonal array with centre to centre spacing of 28 mm. Fuel salt is a 45/45/10 mixture of sodium fluoride, uranium tetrafluoride (with the uranium containing 5% 235U and 10-20% 233U) and zirconium tetrafluoride. The coolant salt is a mixture of 78% sodium fluoride and 22% thorium tetrafluoride.

A 10 cm deep layer of molten bismuth is at the bottom of the reactor tank and a pumping apparatus is suspended from the reactor lid that continually sprays the bismuth on the surface of the coolant salt in the space between the fuel tubes and steam tubes. A portion of the pumped bismuth is diverted through a cooling system that cools the bismuth to 50 C above its melting point. Precipitated uranium and thorium bismuthides are collected and processed to recover 233U. Pellets of metallic thorium placed at the bottom of the tank ensure that the bismuth is always saturated with thorium metal, thereby causing reductive extraction of uranium produced in the coolant by the action of neutrons on the thorium into the molten bismuth layer.

Example 3

The reactor is similar to that described in example 1 except as follows. It is particularly designed to allow sustained periods of operation without replacement of the fuel tubes.

The 20% of fuel tubes not initially containing fuel salt are filled with 70% natural uranium trichloride/5% uranium tetrachloride/25% NaCl instead of coolant salt. This results in a low level of fission and hence heat production within the tube due to fission of uranium isotopes but a relatively large absorption of neutrons by $^{238}$U. Progressive replacement of these tubes with tubes containing fuel salt therefore adds significantly to the net reactivity of the core which will otherwise decline as fissile isotopes are depleted.

Coolant salt contains cadmium fluoride, or another neutron absorbing fluoride, at up to 5 mol % at reactor start up. As the core reactivity falls due to fissile isotope consumption, the cadmium fluoride is progressively reduced to cadmium metal by addition of metallic sodium to the coolant salt. The cadmium metal is molten at the temperature of the coolant and accumulates as a thin layer at the bottom of the tank.

Example 4

The reactor is similar to that described in example 1 except as follows. It is particularly designed to allow long periods between fuel tube replacements while consuming a pre-existing inventory of transuranic isotopes without producing significant amounts of new transuranic isotopes.

The fuel salt contains 15-20% of trichlorides of transuranic isotopes and 80 to 85% thorium tetrachloride. Production of $^{233}$U within the fuel salt from the thorium is not sufficient to maintain the reactivity of the core which accordingly falls in temperature quite rapidly as fissile material is consumed. Fresh fissile material in the form of pellets of 5 mm diameter formed from frozen transuranic trichloride is added periodically to each fuel tube as its individual average temperature falls below a defined threshold. The fuel pellets are inserted into each fuel tube through a mechanism in the fuel tube cap assembly and fall down through the spiral portion of the fuel tube until they reach the molten fuel salt in which they dissolve and mix.

Although the invention has been described in terms of embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

In particular, the following features are identified which may be used with a molten salt fuelled fission reactor separately or in combination.

The heat transfer from the molten salt fuel is achieved by convection or mechanical agitation of the salts within the tubes, i.e. the fuel salts are not driven through external pumps or heat exchangers as in conventional molten salt reactors.

The blanket liquid is a molten salt which circulates convectively within a single tank.

In the breeder configuration, the blanket liquid acts as coolant, neutron absorber, and breeding blanket for the reactor.

A layer of molten metal is present in the blanket, within which the bred fissile isotopes are dissolved, thereby extracting them from the blanket.

The above list is not limiting and the skilled person will appreciate that other features of the above disclosure may be used alone or in combination with other features.

Any discussion of specific materials, concentrations, dimensions, or other specific properties of the reactor are to be taken as exemplary and non-limiting, and the skilled person will recognise that other suitable materials, concentrations, and dimensions will be possible, and within the scope of the invention.

The invention claimed is:

1. A nuclear fission reactor, the reactor comprising a core, a pool of coolant liquid, and a heat exchanger for extracting heat from the coolant liquid, wherein:
   the core comprises an array of hollow fuel tubes, each containing a molten salt fuel comprising one or more fissile isotopes, the fuel tube array being at least partly immersed in the pool of coolant liquid, the fuel tube array comprising a region where the density of the fissile isotopes during operation of the reactor is sufficient to cause a self-sustaining fission reaction;
   wherein heat transfer from the molten salt fuel in each fuel tube to the exterior of that tube is achieved by natural convection of the molten salt fuel;
   and wherein the molten salt fuel comprising fissile isotopes is unpumped and contained entirely within the fuel tubes during operation of the reactor.

2. A reactor according to claim 1, wherein each fuel tube comprise internal baffles configured to divide at least a portion of the tube into segments.

3. A reactor according to claim 2, wherein each segment has a height and diameter that are the same order of magnitude so as to facilitate convection within the segment.

4. A reactor according to claim 1, wherein each fuel tube has a diameter of at least 5 mm.

5. A reactor according to claim 1, wherein one or more of the fuel tubes is formed as a helix.

6. A reactor according to claim 1, wherein an upper portion of each fuel tube is non-linear so as to prevent neutrons passing directly up the fuel tube and out of the reactor.

7. A reactor according to claim 1, wherein each fuel tube comprises a temperature sensor configured to determine the temperature of the molten salt fuel by any one of:
   properties of light emitted from the molten salt fuel;
   an amount of expansion of the fissile material;
   a resonant acoustic frequency of a gas column in the tube.

8. A reactor according to claim 1 wherein the coolant liquid is a molten metal salt contained within a single tank, and the circulation of the coolant liquid is driven by natural convection only.

9. A reactor according to claim 1 wherein the coolant liquid contains a fertile isotope which produces a bred fissile isotope under neutron flux.

10. A reactor according to claim 9, wherein the reactor comprises a layer of molten metal in contact with the coolant liquid, the molten metal being such that the bred fissile isotope is soluble in the molten metal, the reactor further comprising a system for extracting the molten metal.

11. A reactor according to claim 10, and comprising a system for circulating the molten metal such that it is drawn from the layer of molten metal and reintroduced to the coolant liquid as a spray or a plurality of columns, wherein the molten metal is passed to the heat exchanger prior to being reintroduced.

12. A reactor according to claim 1, wherein the heat exchanger comprises an array of tubes within the coolant liquid, the tubes containing a liquid and/or gas which circulates through the array of tubes, wherein the liquid and/or gas is any of:
   water;
   steam;
   water and steam;
   helium;
   carbon dioxide;
   air;
   nitrogen;
   a molten metal or metal salt.

13. A reactor according to claim 1, wherein the fuel tubes comprise any of:
   a molybdenum alloy;
   pure molybdenum;
   a carbon composite; and
   silicon carbide.

14. A reactor according to claim 1, wherein the core further comprises a neutron moderating material.

15. A reactor according to claim 14, wherein said neutron moderating material is provided in moderator tubes within the array of fuel tubes.

16. A reactor according to claim 1, wherein the number density of fuel tubes is reduced towards the centre of the array of fuel tubes.

17. A reactor according to claim 1, wherein the concentration of fissile and/or fertile isotopes in the molten salt fuel within each fuel tube is increased for fuel tubes at the outside of the array of fuel tubes.

18. A reactor according to claim 1, wherein the fuel tubes comprise or contain a metal having a reactivity with halogens intermediate between the fuel tube material and the fissile isotopes.

19. A reactor according to claim 1, wherein the molten salt fuel comprises trihalides of the fissile isotopes.

20. A method of operating a nuclear fission reactor comprising a core, a pool of coolant liquid and a heat exchanger, the core comprising an array of hollow fuel tubes, each containing a molten salt fuel comprising one or more fissile isotopes, the fuel tube array being at least partly immersed in the pool of coolant liquid and comprising a region where the density of the fissile isotopes during operation of the reactor is sufficient to cause a self-sustaining fission reaction, the method comprising:

containing the molten salt fuel entirely within the fuel tubes, the molten salt fuel being unpumped;

transferring heat from the molten salt fuel in each fuel tube to the exterior of that tube and thus to the coolant using natural convection of the molten salt fuel;

and extracting heat from the coolant using the heat exchanger.

* * * * *